United States Patent
Matus

(10) Patent No.: US 9,938,005 B2
(45) Date of Patent: Apr. 10, 2018

(54) THRUST VECTORING ON A ROTOR-BASED REMOTE VEHICLE

(71) Applicant: Teal Drones, Inc., Salt Lake City, UT (US)

(72) Inventor: George Michael Matus, Salt Lake City, UT (US)

(73) Assignee: TEAL DRONES, INC., Salt Lake City, UT (US)

( * ) Notice: Subject to any disclaimer, the term of this patent is extended or adjusted under 35 U.S.C. 154(b) by 20 days.

(21) Appl. No.: 15/190,939

(22) Filed: Jun. 23, 2016

(65) Prior Publication Data

US 2017/0015412 A1 Jan. 19, 2017

Related U.S. Application Data

(60) Provisional application No. 62/193,827, filed on Jul. 17, 2015.

(51) Int. Cl.
*B64C 27/52* (2006.01)
*B64C 27/08* (2006.01)
*G05D 1/08* (2006.01)
*B64C 39/02* (2006.01)
*G05D 1/10* (2006.01)

(52) U.S. Cl.
CPC .............. *B64C 27/52* (2013.01); *B64C 27/08* (2013.01); *B64C 39/024* (2013.01); *G05D 1/0808* (2013.01); *G05D 1/101* (2013.01); *B64C 2201/024* (2013.01); *B64C 2201/027* (2013.01); *B64C 2201/042* (2013.01); *B64C 2201/108* (2013.01); *B64C 2201/145* (2013.01); *B64C 2201/146* (2013.01)

(58) Field of Classification Search
CPC ....... B64C 27/52; B64C 27/08; B64C 39/024; B64C 2201/024; B64C 2201/027; B64C 2201/042; B64C 2201/108; B64C 2201/145; B64C 2201/146; G05D 1/101
See application file for complete search history.

(56) References Cited

U.S. PATENT DOCUMENTS

| 9,561,849 B2 * | 2/2017 | Welsh | B64C 11/46 |
| 2013/0105635 A1 * | 5/2013 | Alzu'bi | B64C 39/024 244/23 A |
| 2016/0023755 A1 * | 1/2016 | Elshafei | G08G 5/025 244/17.13 |
| 2016/0304199 A1 * | 10/2016 | Chan | B64C 39/024 |

\* cited by examiner

*Primary Examiner* — Todd Melton
(74) *Attorney, Agent, or Firm* — Workman Nydegger

(57) ABSTRACT

A rotor-based remote flying vehicle platform comprises a central frame with a control center that is configured to control motors mounted to the vehicle platform. A first arm is connected to the central frame and extends outward. A first motor is mounted to the first arm. The first motor is in communication with the control center. Further, a first tilt actuator is configured to tilt the first motor within a first plane.

20 Claims, 5 Drawing Sheets

THRUST VECTORING ON A ROTOR-BASED REMOTE VEHICLE

CROSS-REFERENCE TO RELATED APPLICATIONS

This application claims the benefit of and priority to U.S. Provisional Patent Application Ser. No. 62/193,827 filed on 17 Jul. 2015 and entitled "THRUST VECTORING ON A ROTOR-BASED REMOTE VEHICLE," which application is expressly incorporated herein by reference in its entirety.

BACKGROUND

After being used in military application for some time, so called "drones" have experienced a significant increase in public use and interest in recent years. The proposed uses for drones has rapidly expanded to include everything from package delivery to mapping and surveillance. The wide-ranging uses for drones has also created a wide assortment of different drone configurations and models. For example, some drones are physically better suited for travelling at high speed, while other drones are physically better suited for travelling long distances.

Conventional drones typically fall within two different categories—fixed-wing drones and rotor-based drones. Rotor-based drones may comprise any number of different rotors, but a common rotor configuration comprises four separate rotors. Rotor-based drones provide several benefits over fixed-wing drones. For example, rotor-based drones do not require a runway to take-off and land. Additionally, rotor-based drones can hover over a position, and in general are typically more maneuverable. Also, rotor-based drones are significantly more capable of flying within buildings and other structures.

Several technical limitations have slowed the wide-spread use and adoption of rotor-based drones. These technical limitations include insufficient control systems for achieving and maintaining flight stability, deficient sensors for accurately obtaining positional data for the rotor-based drones, and high-power usage that both limited the flight time of rotor-based drones and increase their weight from batteries. The increased use of rotor-based drones has presented a need for greater flexibility within individual rotor-based drone systems that address one or more of these technical limitations. As such, there are several problems in the art to be addressed.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein comprise systems, methods, and apparatus configured to provide a rotor-based remote flying vehicle platform with thrust vectoring. In particular, disclosed embodiments comprise rotor-based remote flying vehicle platforms with motors that comprise at least single-axis variable tilting motors. Depending upon desired flight characteristics, the motors can be properly tilted to increase directional thrust and to minimize drag caused by the vehicle frame. As such, the range and speed of a particular rotor-based remote flying vehicle platform can be significantly increased by properly manipulating the tilt of the motors.

Disclosed embodiments include a rotor-based remote flying vehicle platform. The rotor-based remote flying vehicle platform comprises a central frame with a control center that is configured to control motors mounted to the vehicle platform. A first arm is connected to the central frame and extends outward. A first motor is mounted to the first arm. The first motor is in communication with the control center. A first tilt actuator is configured to tilt the first motor within a first plane.

Disclosed embodiments also include a computer-implementation method for adjusting the direction of thrust for motors on a rotor-based remote flying vehicle platform. The method comprises receiving, from a remote broadcast device, a first command to change a current trajectory of the rotor-based remote flying vehicle platform. The method also comprises identifying a first current operating condition of a first motor of the rotor-based remote flying vehicle platform. The first current operating condition comprises an indication of a current tilt associated with the first motor. Additionally, the method comprises calculating, based upon the first current operating conditions and the first command, a first tilt command for the first motor. The first tilt command comprises instructions for causing a first tilt actuator to apply a first specific tilt to the first motor. Further, the method comprises applying, with the first tilt actuator, the first specific tilt to the first motor.

Disclosed embodiments further include a rotor-based remote flying vehicle platform. The rotor-based remote flying vehicle platform comprises a central frame with a control center that is configured to control motors mounted to the vehicle platform. At least four arms are connected to the central frame and extend outward in different directions. The rotor-based remote flying vehicle platform also comprises at least four motors. Each motor is attached to one of the at least four arms. Additionally, each motor is in communication with the control center. The rotor-based remote flying vehicle platform further comprises at least four actuators. Each actuator is configured to tilt one of the at least four motors, wherein each actuator comprises at least two planes of movement.

Additional features and advantages of exemplary embodiments of the invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Disclosed embodiments extend to systems, methods, and apparatus configured to provide a rotor-based remote flying vehicle platform with thrust vectoring. In particular, disclosed embodiments comprise rotor-based remote flying vehicle platforms with motors that comprise at least single-axis variable tilting motors. Depending upon desired flight characteristics, the motors can be properly tilted to increase directional thrust and to minimize drag caused by the vehicle frame. As such, the range and speed of a particular rotor-based remote flying vehicle platform can be significantly increased by properly manipulating the tilt of the motors.

Accordingly, disclosed embodiments allow a rotor-based remote flying vehicle platform to be used in a wide variety of different situations and environments. Additionally, disclosed embodiments allow a rotor-based remote flying vehicle platform to travel at significantly higher speeds and to travel for significantly longer distances. For example, properly tilting one or more motors on a rotor-based flying vehicle platform allows the vehicle to travel at a high rate of speed, while keeping the frame substantially parallel to the ground and thus reducing drag on the vehicle. Reducing the drag, allows the vehicle to travel both faster and more efficiently.

In the following disclosure various exemplary embodiments of the present invention are recited. One will understand that these examples are provided only for the sake of clarity and explanation and do not limit or otherwise confine the invention to the disclosed examples. Additionally, one or more of the following examples is provided with respect to a "quadrotor." One will understand that the usage of a "quadrotor" is merely for the sake of clarity and that the present invention applies equally to all rotor-based remote flying vehicle platforms.

As stated above, one will understand that the depicted quadrotor 100 is merely exemplary. Additional or alternate disclosed embodiments may comprise rotor-based remote flight systems with less than four arms or rotor-based remote flight systems with more than four arms. Additionally, various disclosed embodiments may comprise different physical configurations, construction materials, proportions, and functional components. For instance, rotor-based remote flight platforms may comprise a mixture of components such as cameras, sonars, laser sights, GPS, various different communication systems, and other such variations.

Figure 1:
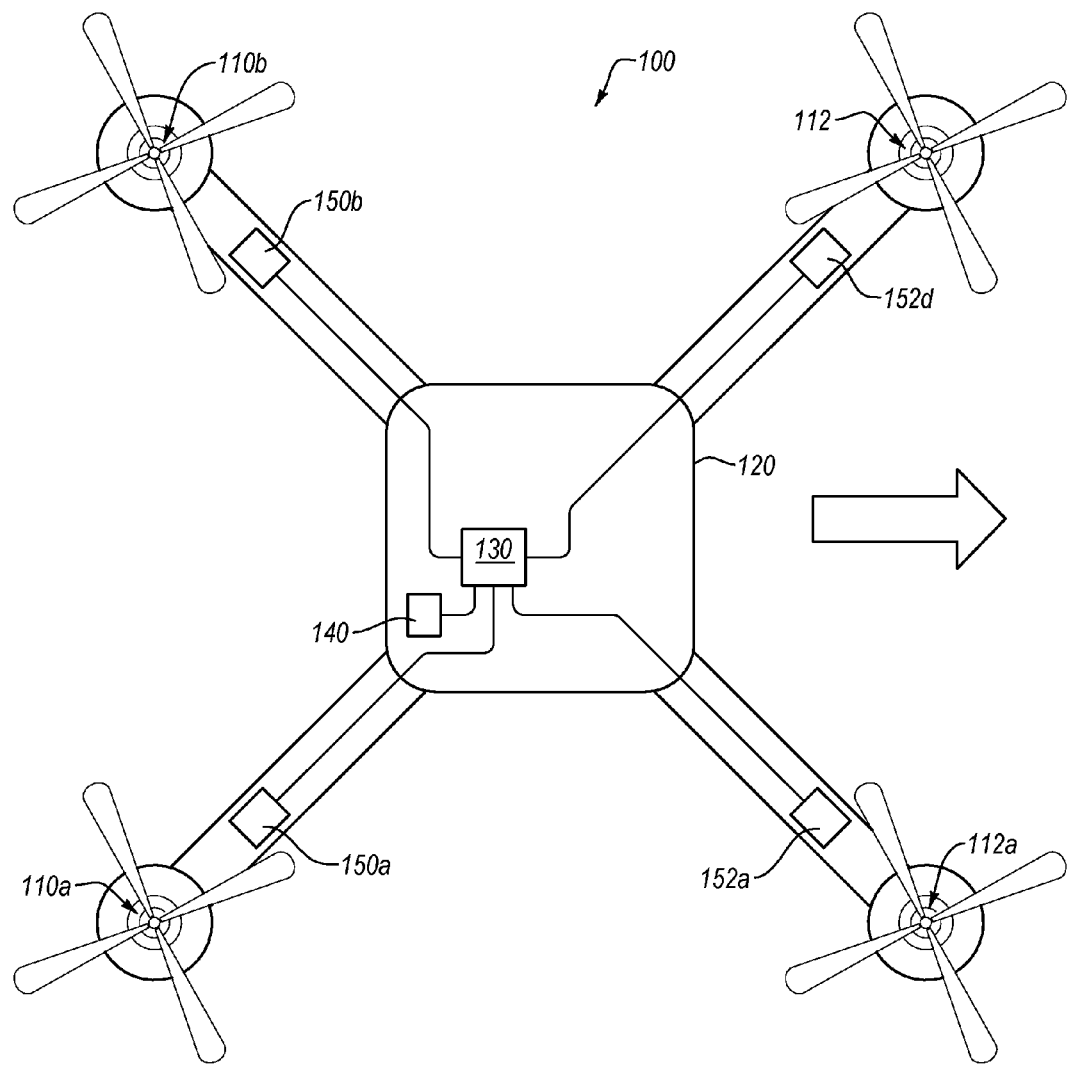
FIG. 1 illustrates a schematic view of an embodiment of a quadrotor.

Turning to the figures, FIG. 1 illustrates a schematic view of an embodiment of a quadrotor 100. In particular, FIG. 1 depicts a representation of a quadrotor 100 that comprises four respective motors 110a, 110b, 112a, 112b. Each motor is positioned on a distal end of an arm with respect to the central frame 120 of the quadrotor 100. Additionally, FIG. 1 includes an arrow depicting a direction of flight for the quadrotor 100. One will understand that conventional quadrotors 100 can fly in any direction with respect to the quadrotor frame and motors. In many cases, however, quadrotors 100 comprise a de facto front based upon the positioning of a camera. Additionally, providing a de facto front of a quadrotor is helpful to an operator who is directing the quadrotor to travel in particular directions. As used within FIG. 1, the arrow, however, is provided only for example and clarity in describing the operation of the quadrotor 100.

To further clarify the respective components and direction of travel of the quadrotor 100, the various motors 110a, 110b, 112a, 112a are positionally named. For example, motor 110a shall herein be described as the rear-right motor. Similarly, motor 110b shall herein be described as the rear-left motor. In contrast, motor 112a shall herein be described as the front-right motor. Similarly, motor 112b shall herein be described as the front-left motor. As such, the exemplary quadrotor 100 of FIG. 1 is described with respect to a direction and motor positions. This description, however, is not meant to limit embodiments of the present invention to any particular directions or motor designations.

The quadrotor 100 also comprises four arms that extend from a central frame 120 of the quadrotor 100. The four arms are each mounted to one of the four above mentioned motors 110a, 110b, 112a, 112b. Additionally, the four arms also comprise four tilt actuators 150a, 150b, 152a, 152b that are associated with each respective motor 110a, 110b, 112a, 112b. While in the depicted embodiment, the four tilt actuators 150a, 150b, 152a, 152b are shown as being midway between the central frame 120 and each respective motor 110a, 110b, 112a, 112b, in various additional or alternative embodiments, the tilt actuators 150a, 150b, 152a, 152b are positioned directly adjacent to the motors 110a, 110b, 112a, 112b or directly adjacent to the central frame 120.

The tilt actuators 150a, 150b, 152a, 152b are configured to tilt the motors 110a, 110b, 112a, 112b. In at least one embodiment, the tilt actuators 150a, 150b, 152a, 152b comprise slip rings that are capable of rotating the motors 110a, 110b, 112a, 112b within a 360° range. In contrast, in at least one embodiment, the tilt actuators 150a, 150b, 152a, 152b comprise motors that are only capable of rotating the motors 110a, 110b, 112a, 112b within a 180° range. For example, the tilt actuators 150a, 150b, 152a, 152b may be configured to rotate the motors 110a, 110b, 112a, 112b in a first direction that is perpendicular to a respective arm and in a second direction that is parallel to the respective arm.

Additionally, in at least one embodiment, the quadrotor 100 comprises a control center 130 that is configured to control the motors 110a, 110b, 112a, 112b that are mounted to the quadrotor 100. The control center 130 comprises a flight control system that manages the flight characteristics of the quadrotor 100. For example, the flight control system may comprise a PID loop for stabilizing flight of the quadrotor 100.

The control center 130 is also in communication with various other electronic components, both in the form of peripherals and on-chip devices. For instance, the control center 130 may communicate with various sensors and data gathering devices such as, but not limited to, cameras, GPS systems, accelerometers, gyroscopes, sonars, LIDARs, and other sensor devices. Additionally, the control center 130 may be in communication with various transmitter and receiver devices such as a remote broadcast device 140. Transmitter and receiver devices comprise one or more systems capable of receiving instructions and broadcasting data, both directly and wirelessly.

Additionally, in at least one embodiment, the remote broadcast device 140 communicates video data, or some other data, back to a user. As such, the remote broadcast device 140 is capable of both receiving and transmitting information. One will understand that the single remote broadcast device 140 is provided for the sake of example and clarity, and that in practice the remote broadcast device 140 may comprise multiple different devices spread throughout the quadrotor 100.

In at least one embodiment, the remote broadcast device 140 receives commands from a user that cause the control center 130 to adjust the flight characteristics of the quadrotor 100. For example, the remote broadcast device 140 may receive a command to change a current trajectory of the quadrotor. In response to the command, the control center 130 changes the direction that the quadrotor 100 is traveling and/or changes the velocity at which the quadrotor 100 is traveling, depending upon the command.

In at least one embodiment, when interpreting a command to change trajectory, the control center 130 identifies a first current operating condition of one or more motors 110a, 110b, 112a, 112b of the quadrotor 100. For example, the control center 130 determines a current tilt and/or relative power output at a driving motor (e.g., rear-left motor 110b). The control center 130 may identify the current operating conditions by accessing, within memory, an indication of the most recent command sent to the motor of interest. Additionally, in at least one embodiment, the control center 130 receives the current operating conditions from the motor or from an electronic speed controller (ESC) associated with the motor. The driving motor is a motor that if increased or decreased in rotational speed (i.e., power output) or increased or decreased in tilt causes the quadrotor to move in the desired direction.

Upon determining the first current operating condition of the motor, the control center 130 calculates a first tilt command for the motor. The first tilt command may comprise instructions for causing a tilt actuator to apply a first specific tilt to the motor. The control center 130 then communicates the command to the appropriate tilt actuator which applies the first specific tilt to the associated motor.

One will understand that the above described process can be applied to different motors and multiple motors simultaneously. For example, the control center 130 can receive a command, calculate a tilt, and cause a respective tilt actuator 150a, 150b, 152a, 152b to tilt any of the motors 110a, 110b, 112a, 112b, either independently or collectively. As such, the control center 130 is capable of identifying a tilt that should be applied to one or more motors in response to a command.

Additionally, in at least one embodiment, calculating a tilt command for a particular motor (e.g., rear-left motor 110b), also comprises calculating an automatic adjustment to a rotational speed of at least one other motor (e.g., front-left motor 112b) to compensate for the specific tilt of the particular motor. For example, the flight control system can identify a change in flight dynamics based upon the adjusted thrust direction of the particular, tilted motor. In response, the flight control system automatically adjusts the rotational speed of another motor to maintain the stable flight characteristics of the quadrotor 100. In at least one embodiment, the flight control system uses a PID loop to automatically calculate the adjusted rotation speed. The control center 130 then causes the other motor to adjust its rotational speed.

In at least one embodiment, a received command comprises an explicit tilt command. For example, the received command may direct the control center 130 to place the quadrotor within a "high-speed configuration." In response to the command, the control center 130 causes the rear tilt actuators 150a, 150b to tilt the rear motors 110a, 110b for optimum forward thrust. In at least one embodiment, the high-speed configuration comprises tilting two adjacent motors to a common tilt.

In contrast, in at least one additional or alternative embodiment, the control center 130 automatically adjusts the tilts of one or more motors 110a, 110b, 112a, 112b. For example, the control center 130 may be configured to limit the drag caused by the quadrotor 100 tilting in response to motor thrust. In such an embodiment, the control center 130 receives angular data from a gyroscope positioned on the quadrotor 100. The angular data describes the current tilt of the quadrotor 100 as the quadrotor 100 moves through space. When the detected tilt of the quadrotor 100 reaches a pre-determined threshold, the control center 130 automatically causes an appropriate tilt actuator 150a, 150b, 152a, 152b to tilt one or more motors 110a, 110b, 112a, 112b to compensate for the tilt of the quadrotor 100 and bring the tilt of the quadrotor 100 within a desired range.

Additionally, in at least one embodiment, the quadrotor tilt threshold is also automatically determined based upon the active sensors on the quadrotor 100. For example, the quadrotor may utilize an image camera positioned on the front face of the quadrotor for automatic obstacle detection and avoidance. One of skill in the art will understand that high degrees of tilt on the quadrotor 100 will result in a front-mounted camera pointed downwards. In such a scenario, the camera may be pointed so far downward that it is no longer able to identify obstacles within the quadrotor's path. As such, in at least one embodiment, when operating with an obstacle avoidance sensor, the control center 130 sets a threshold that is determined by the vertical viewing angle of the camera. Specifically, the control center 130 sets a threshold that ensures the tilt of the motors are continuously adjusted such that the camera always has a sufficient view of the quadrotors flight path.

Similarly, the control center 130 can automatically enforce a threshold on the amount of tilt on the quadrotor based upon any number of different sensors. For instance, when utilizing a sonar sensor mounted to the bottom of the quadrotor 100 to measure altitude, a significant tilt on the quadrotor body may substantially impact the accuracy of readings received by the sonar sensor. As such, similar to the above description, upon detecting the use of the sonar sensor, the control center 130 enforces a tilt threshold that prevents the sonar sensor from being overly tilted.

Figure 2:
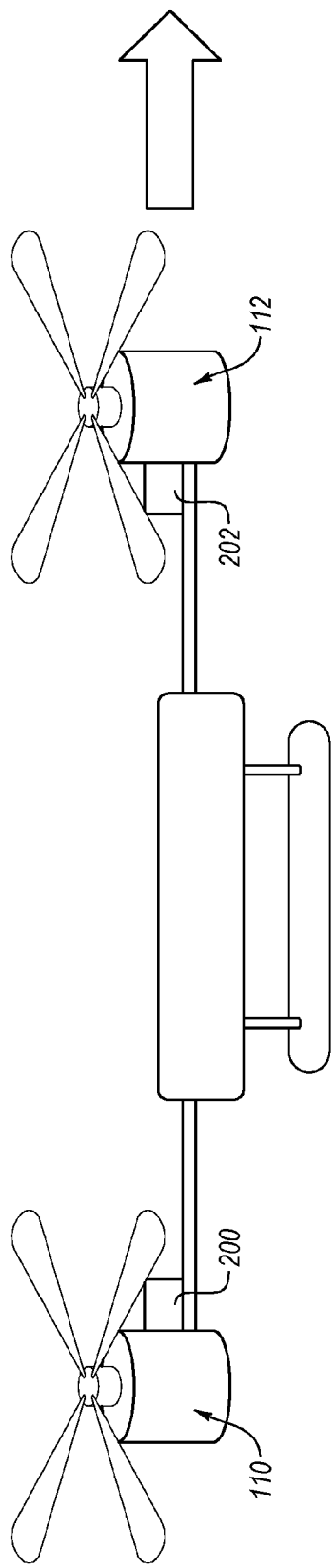
FIG. 2 illustrates a side-view of the quadrotor of Figure.

FIG. 2 illustrates a side view of the quadrotor 100 of FIG. 1. In FIG. 2, the quadrotor 100 is depicted with a rear motor 110 and a front motor 112. Additionally, the quadrotor comprises rear tilt actuators 200 and front tilt actuators 202. The rear tilt actuator 200 and front tilt actuator 202 both directly abut and attach to the rear motor 110 and front motor 112, respectively. One will understand that additional motors and tilt actuators are present but are not viewable due to the side-view of the quadrotor 100. Similar to FIG. 1, an arrow depicts the direction of travel of the quadrotor 100.

The quadrotor of FIG. 2 comprises a quadrotor body 100 with respective motors 110, 112 positioned so that the thrust of the respective motors is perpendicular to a longitudinal axis of the quadrotor 100. One of skill in the art will understand that when moving forward (as indicated by the arrow) the quadrotor 100 will tilt such that the rear motors 110 are positioned higher than the front motors 112. This tilting may be caused by the rear motors 110 outputting greater thrust than the front motors 112. This greater thrust from the rear motors 110 may provide force necessary to move the quadrotor 100 forward.

In at least one embodiment, when the quadrotor 100 is moving forward at a high rate of speed or a high rate of acceleration, the rear motors 110 may be significantly higher the front motors 112. Positioning the rear motors 110 above the front motors 112 causes the quadrotor 100 to no longer be parallel to a ground surface but to instead be at an angle to the ground. One of skill in the art will understand that typically the faster the acceleration and/or velocity, the greater the degree of tilt of the quadrotor 100. The accompanying high angle of tilt of the quadrotor 100 also incurs a significant air resistance penalty. For example, the tilt of the quadrotor 100 exposes a greater surface area of the quadrotor 100 to air resistance caused by the forward movement of the quadrotor 100. The increased air resistance can dramatically increase the power consumption of the quadrotor 100 and cause significant resistance to forward movement.

Figure 3:
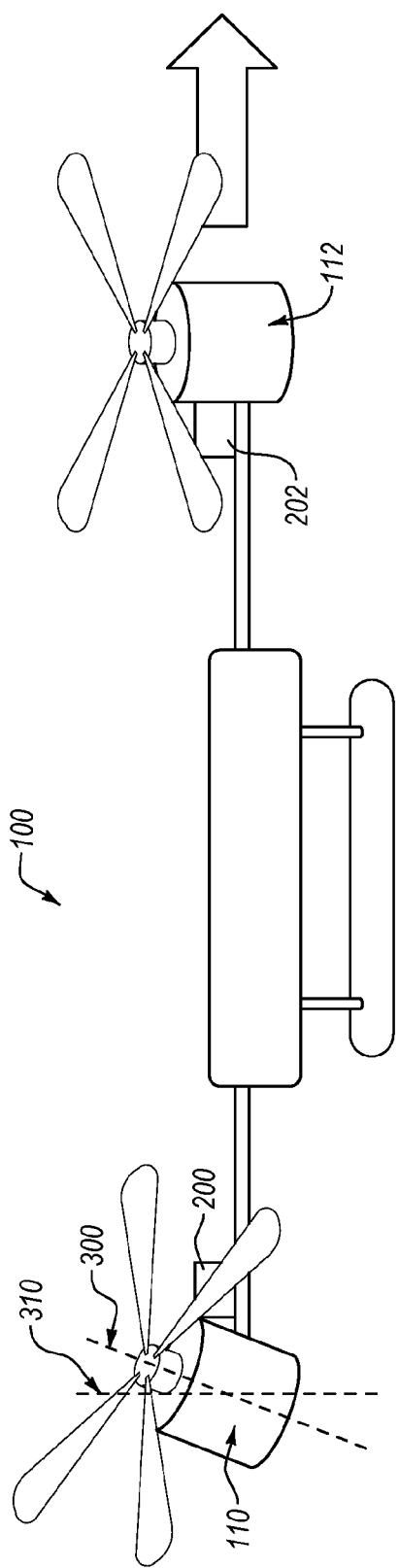
FIG. 3 illustrates a side-view of the quadrotor of FIG. 1 with a tilted motor.

As described above, at least one disclosed embodiment provides a technical solution to the increased air resistance through thrust vectoring. For example, FIG. 3 illustrates a side view of the quadrotor 100 of FIG. 1 with a tilted motor. In particular, the rear tilt actuators 200 have tilted the rear motors 110 to a particular tilt such that the thrust axis 300 of the rear motors 110 is no longer perpendicular to the quadrotor 100 as indicated by the original thrust axis 310.

In at least one embodiment, tilting the rear motors 110 can increase the forward thrust of quadrotor 100. Additionally, the tilted thrust axis 300 of the rear motors 110 can allow the quadrotor 100 to move forward at a high rate of speed without the conventional tilting of the quadrotor 100 caused by having fixed-mounted motors.

In at least one embodiment, when directing a quadrotor 100 to move forward at a high rate of speed, a control center within the quadrotor 100 can automatically tilt the rear motors 112 to the appropriate angle and provide appropriate control signals to the rear motors 110 for power output. The respective angle of tilt and control signals may be influenced by the individual flight dynamics of each quadrotor. In at least one embodiment, the tilt of the motors 110 may be directly proportional to the throttle level of the quadrotor control. Additionally, in at least one embodiment, there is a maximum threshold of tilt that can be applied to the motors 110. For instance, if the motors 110 were positioned such that they were directly parallel with a longitudinal axis of the quadrotor 100, there may not be enough upward thrust from the rear motors 110 to keep the quadrotor 100 hovering.

In at least one embodiment, the quadrotor 100 can behave like a conventional quadrotor without thrust vectoring, unless specifically commanded to enter a thrust-vectoring mode. For example, a user may desire to have conventional behavior from the quadrotor during normal usage. However, the user may also occasionally wish to engage in high-speed flight, high-endurance flight, or control-center guided autopilot. During these times, the user can direct the quadrotor 100 to engage thrust vectoring, which otherwise may not be used.

Figure 4:
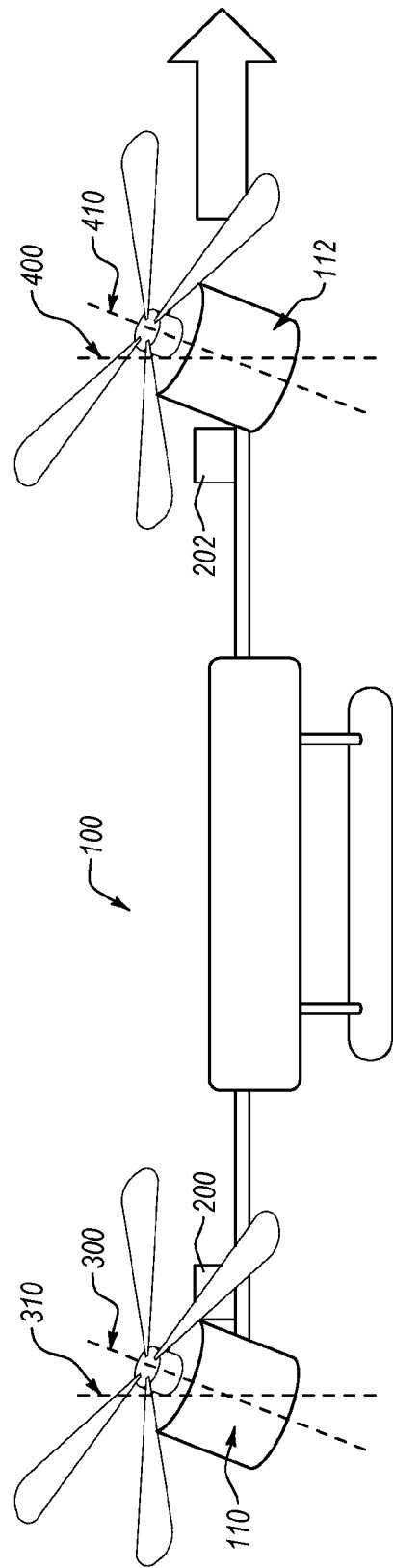
FIG. 4 illustrates a side-view of the quadrotor of FIG. 1 with two tilted motors.

FIG. 4 illustrates a side view of the quadrotor 100 of FIG. 1 with two tilted motors 110, 112. In at least one embodiment, the rear tilt actuators 200 and front tilt actuators 202 tilt both the rear motors 110 and the front motors 112, respectively. As indicated by FIG. 4, the thrust axis 410 of the forward motor 112 is tilted from the original axis 400 (the thrust axis of a fixed motor). The tilted thrust axis 410 provides not only upwards thrust, as provided by fix motors, but also provides forward thrust. In at least one embodiment, tilting the rear motors 110 and the forward motors 112 significantly increases the speed and endurance of a quadrotor by minimizing wind resistance and by generating additional forward thrust not present in a fixed motor.

Figure 5:
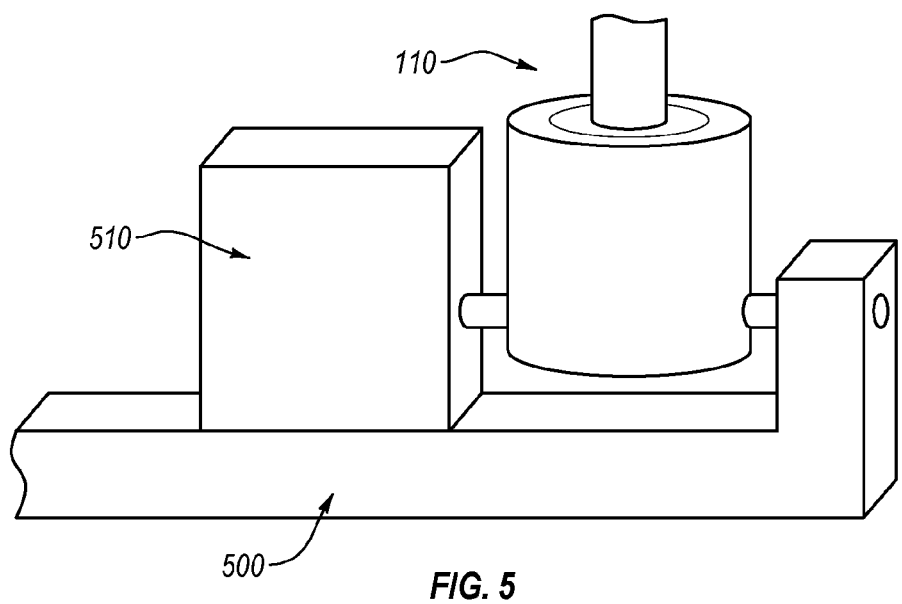
FIG. 5 illustrates a close-up view of an embodiment of a variable tilting motor mount.

FIG. 5 illustrates a close-up view of an embodiment of a tilt actuator. In particular, FIG. 5 depicts a motor 110 attached to a quadrotor arm 500. The motor 110 is held to the arm 500 through a tilt actuator 510. In at least one embodiment, the tilt actuator 510 comprises a motor mount for mounting the motor 110 to the quadrotor 100. The tilt actuator 510 receives and executes commands to tilt the motor 110 within one or more planes. For example, in at least one embodiment, the tilt actuator 510 is capable of tilting the motor 110 in any direction within three-dimensional space. For instance, in at least one embodiment, the tilt actuator 510 tilts the motor 110 such that entire motor 110 is upside down. Additionally, the tilt actuator 510 is also capable of tilting the motor 110 in a direction that is parallel to the length of the arm 500.

Figure 6:
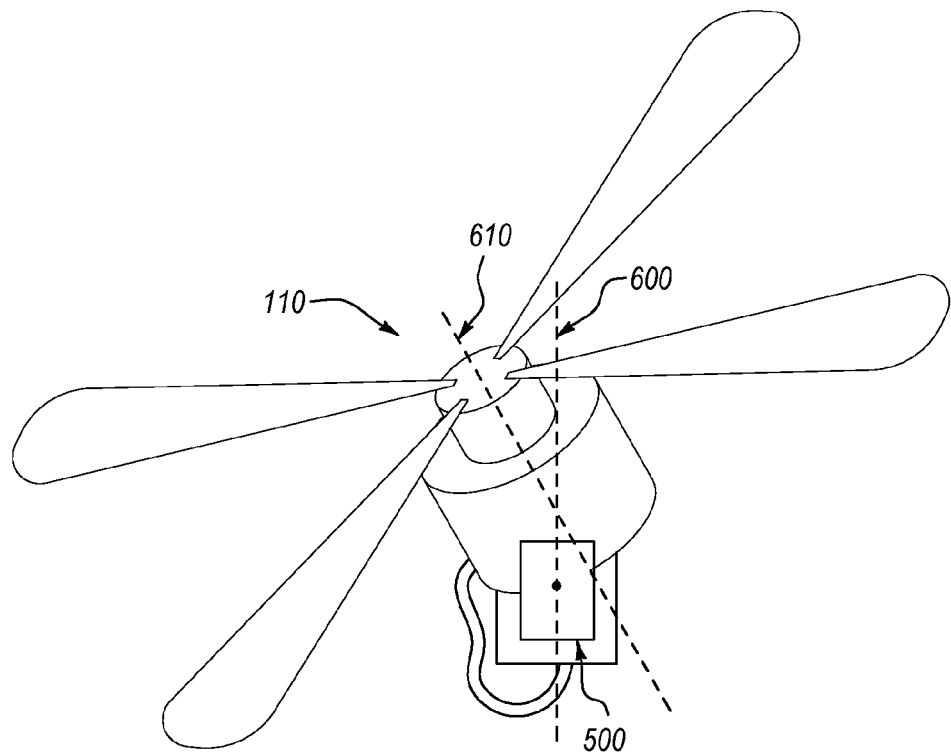
FIG. 6 illustrates another close-up view of the variable tilting motor mount of FIG. 5.

FIG. 6 illustrates another close-up view of the variable tilting motor mount 600 of FIG. 5. In particular, FIG. 6 depicts the motor 110 with a thrust axis 610 that is different than a conventional, original thrust axis of the motor 110. As depicted, the tilt actuator has tilted the motor 110 to a desired tilt with respect to the arm 500.

While FIGS. 5 and 6 depict the tilt actuator connecting the motor 110 to the arm 500, in alternate embodiments (not shown) the tilt actuator may connect the arm to the central frame. For example, the arm may be attached to the central body by a slip ring. The slip ring can be a component within a tilt actuator such that the entire arm 500 rotates causing the motor 110 to also rotate.

Additionally, in at least one embodiment, instead of, or in addition to, tilting the motors 110 at a motor mount, the motors 110 can be tilted by tilting and/or otherwise manipulating a quadrotor arm. For example, a tilt actuator may connect a quadrotor arm to the frame of the quadrotor. A motor 110 mounted to the arm may be tilted by actuating the tilt actuator to rotate the entire quadrotor arm.

In at least one embodiment, control of the thrust vectoring can be automatically handled by the control unit within the quadrotor or by an external computing system. For example, based upon a particular desired distance of flight and/or speed of flight, the quadrotor can be automatically configured to the most optimum thrust vectoring. For instance, a long distance with a light load may be most optimum with a high thrust vectoring angle. In contrast, a short flight with a heavy load may be most optimum with a conventional thrust angle that maximizes upward thrust.

One will appreciate that embodiments disclosed herein can also be described in terms of flowcharts comprising one or more acts for accomplishing a particular result. For example, FIG. 7 and the corresponding text describe acts in various methods and systems for adjusting the direction of thrust for motors on a rotor-based remote flying vehicle platform. The acts of FIG. 7 are described below.

Figure 7:
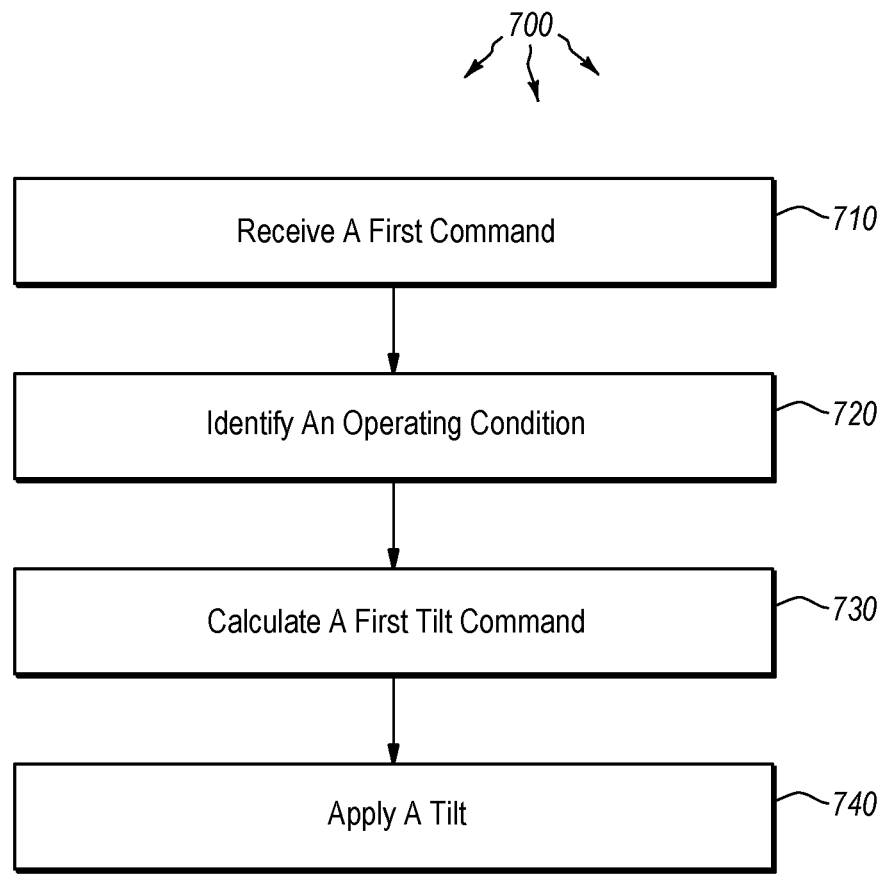
FIG. 7 illustrates a flowchart for an embodiment of a method for adjusting the direction of thrust for motors on a rotor-based remote flying vehicle platform.

For example, FIG. 7 illustrates that a flowchart for an embodiment of a method 700 for adjusting the direction of thrust for motors on a rotor-based remote flying vehicle platform can comprise an act 710 of receiving a first command. Act 710 includes receiving, from a remote broadcast device, a first command to change a current trajectory of the rotor-based remote flying vehicle platform. For example, as depicted and described with respect to FIG. 1, a remote broadcast device 140 receives commands from a user. The user may send the commands through a remote controller, a computer interface, a smart phone, or through any number of different means for communicating data to a quadrotor.

FIG. 7 also illustrates that the method 700 comprises an act 720 of identifying an operating condition. Act 720 includes identifying a first current operating condition of a first motor of the rotor-based remote flying vehicle platform. The first current operating condition comprises an indication of a current tilt associated with the first motor. For example, as depicted and described with respect to FIG. 1, the control center 130 may identify the current operating conditions by accessing, within memory, an indication of the most recent command sent to the motor of interest. Additionally, in at least one embodiment, the control center 130 receives the current operating conditions from the motor or from an electronic speed controller (ESC) that is associated with the motor.

Additionally, FIG. 7 illustrates that the method 700 comprises an act 730 of calculating a first tilt command. Act 730 includes calculating, based upon the first current operating conditions and the first command, a first tilt command for the first motor. The first tilt command comprises instructions for causing a first tilt actuator to apply a first specific tilt to the first motor. For example, as depicted and described with respect to FIG. 1, the control center 130 calculates a first command that is responsive to the received command. The calculated tilt command may comprise a command to increase the tilt that is applied to a motor in order to increase forward thrust.

Further, FIG. 7 illustrates that the method 700 comprises an act 740 of applying a tilt. Act 740 includes applying, with the first tilt actuator, the first specific tilt to the first motor. For example, as depicted and described with respect to FIG. 3, the control center 130 sends a tilt command to a particular tilt actuator. The tilt actuator tilts in response to the received command.

Accordingly, in at least one embodiment, a quadrotor can be quickly and easily modified to incorporate any number of different features and provide a remote user with accessing control over those features.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A rotor-based remote flying vehicle platform comprising:
   a central frame with a control center that is configured to control motors mounted to the vehicle platform, wherein controlling the motors mounted to the vehicle platform comprises:
   detecting when a current tilt of the rotor-based remote flying vehicle platform has reached a pre-determined threshold, and
   in response to detecting that the current tilt of the rotor-based remote flying vehicle platform has reached the pre-determined threshold, automatically causing a first tilt actuator of the rotor-based remote flying vehicle to tilt a first motor of the rotor-based remote flying vehicle platform to reduce the current tilt of the rotor-based remote flying vehicle platform;
   a first arm that is connected to the central frame and extends outward;
   the first motor mounted to the first arm, wherein the first motor is in communication with the control center; and
   the first tilt actuator configured to tilt the first motor within a first plane.

2. The rotor-based remote flying vehicle platform as recited in claim 1, further comprising:
   multiple arms connected to the central frame and extending outward;
   multiple motors mounted to the respective arms, wherein the multiple motors are in communication with the control center; and
   multiple tilt actuators configured to tilt the respective motors within a respective plane.

3. The rotor-based remote flying vehicle platform as recited in claim 2, wherein the first tilt actuator and the multiple tilt actuators are configured to tilt the first motor and the respective motors within multiple respective planes.

4. The rotor-based remote flying vehicle platform as recited in claim 1, wherein the first tilt actuator comprises a first motor mount.

5. The rotor-based remote flying vehicle platform as recited in claim 4, wherein the first motor mount connects the first motor to the first arm.

6. The rotor-based remote flying vehicle platform as recited in claim 1, wherein the first tilt actuator connects the first arm to the central frame.

7. The rotor-based remote flying vehicle platform as recited in claim 1, wherein the first tilt actuator adjusts based upon the current operating characteristics of the rotor-based remote flying vehicle platform.

8. The rotor-based remote flying vehicle platform as recited in claim 1, wherein the first tilt actuator comprises a slip ring.

9. The rotor-based remote flying vehicle platform as recited in claim 8, wherein the first tilt actuator is configured to rotate the first motor 360°.

10. A computer-embodiment method for adjusting the direction of thrust for motors on a rotor-based remote flying vehicle platform, the method comprising:
    receiving a first command to change a current trajectory of the rotor-based remote flying vehicle platform;
    in response to receiving the first command, changing the current trajectory of the rotor-based remote flying vehicle platform;
    upon changing the current trajectory, detecting that a current tilt of the rotor-based remote flying vehicle platform has reached a pre-determined threshold;
    in response to dectecting that the current tilt of the rotor-based remote flying vehicle platform has reached the pre-determined threshold, automatically reducing the current tilt of the rotor-based remote flying vehicle platform, wherein reducing the current tilt of the rotor-based remote flying vehicle platform comprises at least the following:

identifying a first current operating condition of a first motor of the rotor-based remote flying vehicle platform, wherein the first current operating condition comprises an indication of a current tilt associated with the first motor;

calculating, based upon the first current operating conditions and the first command, a first tilt command for the first motor, wherein the first tilt command comprises instructions for causing a first tilt actuator to apply a first specific tilt to the first motor; and applying, with the first tilt actuator, the first specific tilt to the first motor.

11. The method as recited in claim 10, further comprising:

identifying a second current operating condition of a second motor of the rotor-based remote flying vehicle platform, wherein the second current operating condition comprises an indication of a current tilt associated with the second motor;

calculating, based upon the second current operating conditions and the first command, a second tilt command for the second motor, wherein the second tilt command comprises instructions for causing a second tilt actuator to apply a second specific tilt to the second motor; and applying, with the second tilt actuator, the second specific tilt to the second motor.

12. The method as recited in claim 11, further comprising:

applying, with a third tilt actuator, a third specific tilt to a third motor; and applying, with a fourth tilt actuator, a fourth specific tilt to a fourth motor.

13. The method as recited in claim 10, wherein the first motor is positioned on a distal end of an arm with respect to a vehicle body.

14. The method as recited in claim 13, wherein the first actuator is positioned between the first motor and the vehicle body.

15. The method as recited in claim 10, wherein the first tilt command comprises an instruction for causing the first tilt actuator to rotate 180°.

16. The method as recited in claim 15, wherein the first tilt actuator comprises a slip ring.

17. The method as recited in claim 15, wherein the first tilt actuator comprises at least two planes of movement.

18. The method as recited in claim 10, wherein the first command comprises a command to configure the rotor-based remote flying vehicle into a high-speed configuration, wherein the high-speed configuration comprises tilting two adjacent motors to a common tilt.

19. The method as recited in claim 10, further comprising:

automatically adjusting, within a flight control system, a rotational speed of at least one other motor to compensate for the first specific tilt of the first motor.

20. A rotor-based remote flying vehicle platform comprising:

a central frame with a control center that is configured to control motors mounted to the vehicle platform, including detecting when a current tilt of the rotor-based remote flying vehicle platform has reached a pre-determined threshold and in response to detecting that the current tilt of the rotor-based remote flying vehicle platform has reached the pre-determined threshold, automatically causing at least one actuator of the rotor-based remote flying vehicle to tilt a corresponding motor of the rotor-based remote flying vehicle platform to reduce the current tilt of the rotor-based remote flying vehicle platform;

at least four arms that are connected to the central frame and extends outward in different directions;

at least four motors, each motor attached to one of the at least four arms, wherein each motor is in communication with the control center; and at least four actuators, each actuator configured to tilt one of the at least four motors, wherein each actuator comprises at least two planes of movement.

* * * * *